UNITED STATES PATENT OFFICE.

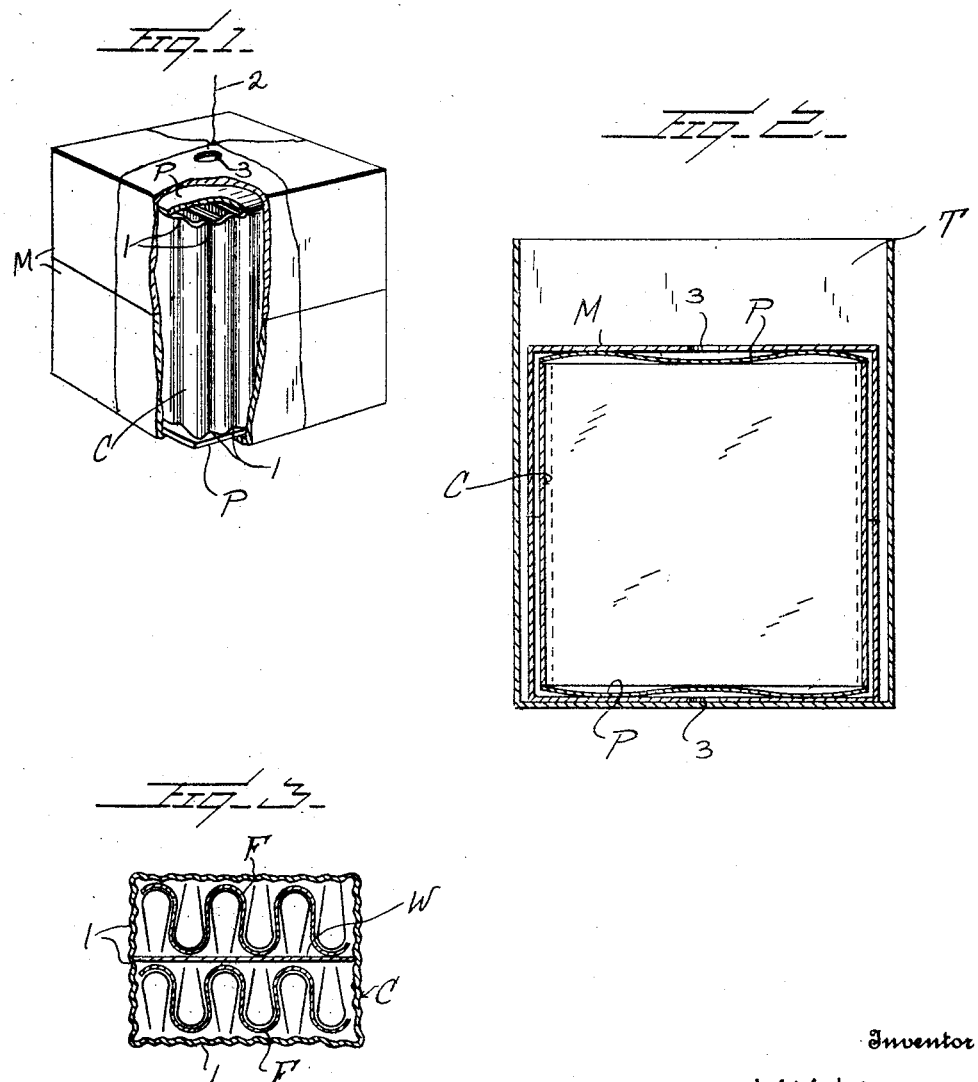

WEI-YOH, WU, OF ITHACA, NEW YORK.

FLUID-TREATING APPARATUS.

1,364,230.   Specification of Letters Patent.   Patented Jan. 4, 1921.

Application filed September 29, 1919.   Serial No. 327,037.

*To all whom it may concern:*

Be it known that I, WEI-YOH, WU, citizen of China, residing at Ithaca, in the county of Tompkins and State of New York, have invented certain new and useful Improvements in Fluid-Treating Apparatus, of which the following is a specification, reference being had to the accompanying drawings.

This invention relates to certain improvements in fluid treating apparatus and has relation more particularly to a device of this general character especially designed and adapted for use in connection with photography, and it is an object of the invention to provide a novel and improved apparatus of this general character embodying parts whereby the same may be readily and conveniently employed for developing, fixing, washing and drying dry plates or pack films in daylight or outdoors after the plates or pack films have once been loaded.

It is also an object of the invention to provide a novel and improved device of this general character wherein the parts comprised therein are produced from a non-corrosive material whereby the efficacy of the apparatus is materially increased.

The invention consists in the details of construction and in the combination and arrangement of the several parts of my improved fluid treating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective with a portion broken away of an assembly comprised in my improved fluid treating apparatus, as herein embodied, and for use in connection with dry plates;

Fig. 2 is a vertical sectional view of the assembly as illustrated in Fig. 1 applied within the tank with which the same coacts, and, Fig. 3 is a horizontal sectional view taken through an assembly for use in connection with pack films.

As disclosed in the accompanying drawings C denotes a cage preferably rectangular in form, and which may be formed of corrugated metal plate, black enameled, or of hard rubber or other relatively light non-corrosive material. The cage C is provided in the opposed faces of its walls with the vertically disposed grooves or corrugations 1. The width of each of the grooves or corrugations 1 may be made just sufficient to hold two dry plates, and the dimensions of the cage C are such as to permit the cage C to be employed in connection with plates of two different sizes and as afforded by the length of the cage C and the width thereof. The cage C is to be of a height demanded by the requirements of practice.

The upper or lower faces or opposed ends of the cage C are open and each of said open faces or ends is adapted to have disposed thereover a relatively thin plate P of the same material as the cage C, and which is wavy or undulated with its dimensions approximately the dimensions of the open face or end of the cage C.

My improved apparatus comprises two cover members M of substantially duplicate construction and formed of the same material as the cage C or plates P. Each of the cover members is rectangular in form and of a depth slightly greater than half the height of the cage C.

T denotes a solution tank formed of a non-corrosive material or of a metal provided with a non-corrosive coating and the tank T has its internal dimensions such as to receive therein the assembled cage C, plates P and cover members M, and preferably of a height greater than such assembled parts.

When my improved apparatus is employed in connection with dry plates care must be exercised to see that the various parts are thoroughly clean. An end plate P is positioned on the bottom of a cover member M and the cage C is then inserted within the cover member M and rested upon the plate P. These assembled parts are then placed within a changing bag or dark room, together with the second end plate P and the second cover member M. Inside of the changing bag or dark room two exposed dry plates arranged back to back or a single dry plate is engaged with a pair of opposed grooves 1 of the cage C and this operation is continued until the plates are exhausted or the cage C loaded. After the cage C has been loaded the second end plate P is placed upon the top of the cage C and the second cover member M applied. The combined outfit is now ready to be brought out into the light, and a string or other flexible member is disposed around the parts to maintain the same in assembled relation.

A suitable developing solution is applied within the tank T and the assembled outfit is slowly immersed in the solution. The solution enters the cage C by percolating through a hole 3 in the central portion of the bottom cover member M and is diverted by the end plates P. The air within the assembled outfit escapes through the hole 3 in the central portion of the upper cover. To assure the removal of the air bubbles on the plates within the cage C the assembled outfit is raised or lowered several times in the tank T and preferably through the instrumentality of the string 2 or other flexible member. This last operation is repeated at intervals in order to stir up the solution to secure even development.

The time of development is determined by the character of the developer used, and after the plates have been fully developed the solution is poured off without removing any parts of the assembled or combined outfit. After the solution has been removed the assembled or combined outfit and the tank is washed with clean water placed within the tank T covering the combined or assembled outfit. This cleansing operation is materially facilitated by raising and lowering the combined or assembled outfit within the water through the instrumentality of the string 2 or the like.

After the washing operation the water is poured off and a fixing solution is placed within the tank at a depth to immerse the combined or assembled outfit, and said combined or assembled outfit is retained in the solution until the plates are fully fixed, as determined by the strength of the solution. The fixing solution is then poured off and the plates brought out for examination, after which the plates are preferably again washed in running water or several changes of water until the fixing chemicals have been thoroughly removed.

In order to dry the plates the cage C only is employed. With the plates properly engaged within the grooves 1 of the cage C said cage C is placed in an inclined position with the plates vertically disposed. This drying operation is materially facilitated by placing the cage C in a position whereby an air draft may pass therethrough.

When the cage C is used in connection with a pack film a partition plate or wall W of non-corrosive material or of metal coated with a non-corrosive substance is engaged with opposed central grooves 1 of the cage C whereby said cage is divided into two compartments. A film partition F is then applied within each of these compartments, and said film partition comprises a plate of non-corrosive material or of metal, provided with a non-corrosive coating. The film partition is also waved or undulated, whereby a plurality of chambers are provided, in each one of which is adapted to be applied a pack film. The pack films are separately inserted when this second assembly is within a changing bag or dark room. The operations for developing and fixing the film are substantially the same as has hereinbefore been set forth with respect to the outfit for use in connection with dry plates. The washing of the films is preferably done outside of the cage C and after the films have been thoroughly washed, the same may be dried in the ordinary way of handling.

With an apparatus constructed in accordance with an embodiment of my invention a single tank T can be readily employed for several purposes, and can also be employed with equal facility in connection with dry plates or pack films.

My improved apparatus also permits the developing and fixing to be done in succession with a single tank under any condition of light after once loaded, and there is no liability of scratching or otherwise marring the films or the plates; also, there is no need of an extra fixing tank and dark room for transferring the plates or films.

The construction of the various parts comprised in my apparatus is extremely simple and inexpensive and of a character that each may be made of absolutely corrosion proof materials.

The assembly of my improved apparatus is such that the same is absolutely light proof, and the structure of each part is such that the same can be thoroughly and easily cleaned. Furthermore, with my improved apparatus the solution can be easily, evenly and automatically percolated in without any special device or funnels for pouring the solution, and the solution can be poured off easily and conveniently without the need of a drainage system.

From the foregoing description, it is thought to be obvious that a fluid treating apparatus constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An apparatus of the class described comprising a cage having opposed ends open, the opposed walls of the cage being grooved, removable undulated plates coacting with the open ends of the cage and extending substantially entirely thereover, and separable cover members adapted to receive and incase the cage and applied end plates, said cover members being provided with openings.

2. An apparatus of the class described comprising a cage having opposed ends open, the opposed walls of the cage being grooved, undulated plates coacting with the open ends of the cage, separable cover members adapted to receive and incase the cage and applied end plates, said cover members being provided with openings, a partition plate insertible within the cage in engagement with opposed grooves, and an undulated film partition insertible within the cage at either side of the partition plate.

3. An apparatus of the class described comprising a cage having opposed ends open, the opposed walls of the cage being grooved, undulated plates coacting with the open ends of the cage, cover members adapted to receive and incase the cage and applied end plates, said cover members being provided with openings, and an undulated film partition insertible within the cage.

4. An apparatus of the class described comprising a cage and an undulated film partition insertible within said cage, said cage being provided with a means to permit the ingress of fluid therein.

5. An apparatus of the class described comprising a cage having opposed ends open, the opposed walls of the cage being grooved, removable undulated plates coacting with the open ends of the cage and extending substantially entirely thereover, and separable cover members adapted to receive and incase the cage and applied end plates, said cover members being provided with openings, said cover members, when applied, operating to maintain the undulated plates in applied position.

In testimony whereof I hereunto affix my signature.

WEI-YOH, WU.